US008457782B2

(12) United States Patent
Ksiazek

(10) Patent No.: US 8,457,782 B2
(45) Date of Patent: Jun. 4, 2013

(54) METHOD AND SYSTEM FOR REFERENCING A SPECIFIC MAIL TARGET FOR ENHANCED MAIL OWNER CUSTOMER INTELLIGENCE

(75) Inventor: Steven Ksiazek, Hoffman Estates, IL (US)

(73) Assignee: Bell and Howell, LLC, Durham, NC (US)

( * ) Notice: Subject to any disclaimer, the term of this patent is extended or adjusted under 35 U.S.C. 154(b) by 346 days.

(21) Appl. No.: 12/882,755

(22) Filed: Sep. 15, 2010

(65) Prior Publication Data

US 2011/0066281 A1 Mar. 17, 2011

Related U.S. Application Data

(60) Provisional application No. 61/242,613, filed on Sep. 15, 2009.

(51) Int. Cl.
*G06F 7/00* (2006.01)
*G06F 17/00* (2006.01)
*G06F 9/00* (2006.01)
*G06G 7/00* (2006.01)

(52) U.S. Cl.
USPC ........... 700/224; 700/225; 700/226; 700/215; 700/227; 705/400; 705/401; 705/406; 705/410

(58) Field of Classification Search
None
See application file for complete search history.

(56) References Cited

U.S. PATENT DOCUMENTS

2006/0089921 A1 * 4/2006 Witmond et al. ............. 705/401
2006/0131378 A1 * 6/2006 Baker et al. ................... 235/375

* cited by examiner

*Primary Examiner* — Yolanda Jones
(74) *Attorney, Agent, or Firm* — McDermott Will & Emery LLP

(57) ABSTRACT

The present application relates to the ability to track mail items through a postal authority network with reference to a specific mail target. More particularly, the present application relates to a system and method for enabling tracking of event data by a mail owner of one or more mail items specifically by mail target through a mail delivery network's mail stream.

10 Claims, 4 Drawing Sheets

300

320

METHOD AND SYSTEM FOR REFERENCING A SPECIFIC MAIL TARGET FOR ENHANCED MAIL OWNER CUSTOMER INTELLIGENCE

CROSS-REFERENCE TO PROVISIONAL APPLICATION

This application claims the benefit of U.S. Provisional Application No. 61/242,613 entitled "METHOD AND SYSTEM FOR REFERENCING A SPECIFIC MAIL TARGET FOR ENHANCED MAIL OWNER CUSTOMER INTELLIGENCE" filed on Sep. 15, 2009, the disclosure of which is entirely incorporated herein by reference.

TECHNICAL FIELD

The various methods and systems discussed herein pertain to the ability to track mail items through a postal authority network with reference to a specific mail target.

BACKGROUND

Document processing facilities are a vital part of any major enterprise for ensuring effective mail based communication between the enterprise and its external and internal constituencies. Typically, document processing facilities employ a multitude of operational processes, people and/or machine resources and systems for processing the often massive quantities of letters, packages, envelopes, coupon booklets, brochures, post cards, and other items of mail intended for external distribution via a mail distribution network (e.g., the United States Postal Service (USPS)) or internal distribution within the enterprise. The types of processes performed respective to a mail article will vary depending on the mail article type, the function of the mail article and the capabilities and requirements of the machine resource or system engaged in that article's processing.

Types of machine resources found within a typical document processing facility may vary from one facility to the next, but may generally include sorters for sorting mail articles according to a sort scheme into one or more mail bins, inserters for manufacturing mail articles and preparing them for distribution, cutters, printers and folders for generating, assembling, arranging and organizing mail articles, mail bins for accumulating the multitude of mail articles processed in preparation for distribution, postage meters for applying postage to mail articles according to their particular weight class/mail category, etc. In addition, a multitude of computing resources may be interconnected with the various machines within the facility to ensure proper operation and connectivity of the devices (e.g., connectivity to an application server capable of executing software associated with the device) as well as to track articles during processing. Furthermore, each of these devices or computing resources may be supported and/or used by one or more device operators/users who execute tasks in connection with one or more customers, projects or procedures. Suffice to say, a plurality of machine resources, people, and processes must be effectively coordinated to ensure optimal operation of the document processing environment in the production of mail items intended for delivery via a mail delivery network, such as that maintained by the United States Postal Authority (USPS).

In the case of the USPS, a mail item may flow through a plurality of destination entries positioned throughout the United States before ever reaching the addressee (Mail Target). The various destination entries of the USPS network may include Bulk Mail Centers (BMCs), Sectional Center Facilities (SCFs), Destination Delivery Units (DDUs) and Destination Area Distribution Centers (DADCs). Each destination entry may process the mail item in different ways using different equipment as it flows through the network, including validating it for compliance with postal authority design regulations, imaging it for delivery point verification, printing upon it, sequencing it for final delivery, scanning it to enable a general means of tracking by the mailer or mail owner, etc. The extent to which the above described processes are performed depends on the mail type to be processed (e.g., first class, flats), the distance between the location of initial induction into the delivery network's mail stream and the final delivery point of the target and the processing capabilities of respective destination entries within the postal network.

It is not uncommon for a mail owner, such as an enterprise desiring to deliver a plurality of mail articles to one or more mail targets, to outsource the mail preparation, coordination and processing tasks required to ensure delivery of mail items to the targets via a mail delivery network. For example, a mail owner may prepare mail items in-house accordingly, complete with inserts, return envelopes, properly applied postage and address data, etc. using one or more inserter devices. Once complete, however, the mail owner may then submit the enveloped mail items to a mail processing service provider (e.g., Pre-sort Bureau) to be further arranged, sorted and prepared for submission to a postal authority (e.g., United States Postal Service) by one or more sort processing devices. Activities performed by the mail processing service provider may include printing onto the mail items a postal authority barcode such as an Intelligent Mail Barcode (IMB) or other barcode, co-mingling the mail owner's submitted mail items with the mail of other mail owner's in order to attain greater mail volume and/or achieve higher ZIP Code based work sharing discounts, performing various address or delivery point correction and verification services using specialized and approved software, etc.

To maintain a degree of control and point of accountability for the integrity of the mail items submitted to the mail delivery network, the IMB applied to each mail item may have encoded therein an identifier associated with the customer (e.g., 6 or 9 digit Mailer Identifier). In such instances, the barcode is usually printed onto the mail item by the mail owner and made visible within the address block window of the item. However, the mail processing service provider will typically prepare and print onto the clear zone of the mail item an IMB that is specific to the mail processing service provider as opposed to the mail owner. This is done, in part to fulfill the traceability requirements of the postal authority—i.e., enabling the postal authority to account for the actual owner and/or submitter of the mail item. Moreover, this practice is typically preferred by the mail processing service provider so that they may better account for the mail items they place into the mail delivery network for processing and eventual delivery to the mail owner's intended targets.

Using the IMB as a tracking code enables the postal authority to convey event data related to each mail item as it progresses through various stages of processing within the mail delivery network. The event data may then be accessed for retrieval and query based on specific search criteria. Mail stream event data may indicate, amongst other things, the identity of the mail item by reference to its printed IMB, timestamp and location data for the mail item through the postal authority network, processing occurrence data, etc. Hence, both the mail service provider and mail owner may track the mail items, but only to the extent they have information (search variables) by which to query the postal authority tracking database—i.e., IMB tracking code associated with the 100 mail item, designated ZIP Code, mailing date, etc. If the mail owner does not have knowledge of the IMB tracking code assigned to the mail item by the mail processing service provider, or detail regarding the date of submission of the mail items to the postal authority, the traceability of their mail items is compromised. There currently exists no means to ensure that a mail owner can readily track a mail item intended for a specific target once they have relinquished mail processing control of the item to a mail processing service provider.

SUMMARY

In certain examples, a method is provided for associating data of a mail item with an intended mail target during processing of the mail item through a mail production environment and a mail delivery network. The method includes reading a mail item identifier from an address block on the mail item on a mail sorting device in the mail production environment. The mail item identifier is associated with the mail target to which the mail item is addressed, and metadata associated with the mail target. A postal authority delivery point barcode containing a unique mail item identifier is generated. The mail item identifier is associated with the unique mail item identifier. The postal authority delivery point barcode is printed on the mail item. The mail item is transferred to the mail delivery network. Event data from processing of the mail item in the mail delivery network is stored. A report containing information obtained during the processing of the mail item through the mail production environment and the mail delivery network is generated.

It is further desirable to provide a system for associating data of a mail item with an intended mail target during processing of the mail item through a mail production environment and a mail delivery network, the system comprising. An image reader is provided and is associated with a mail processing device within the mail production environment. The image reader is capable of reading an image of a mail item identifier captured from an address block on the mail item. A printer is configured to print a postal authority delivery point barcode containing a unique mail item identifier. A first processor is programmed to associate the mail target with the mail item identifier and the unique mail item identifier. One or more second processors is programmed to collect mail target data associated with an owner of the mail item, a mail service provider which processes the mail item, and a mail delivery network which delivers the mail item to the mail target. A response controller is associated with the mail owner and configured to aggregate the data associated with the mail target, and generate parametric reports.

The advantages and novel features are set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations described herein

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
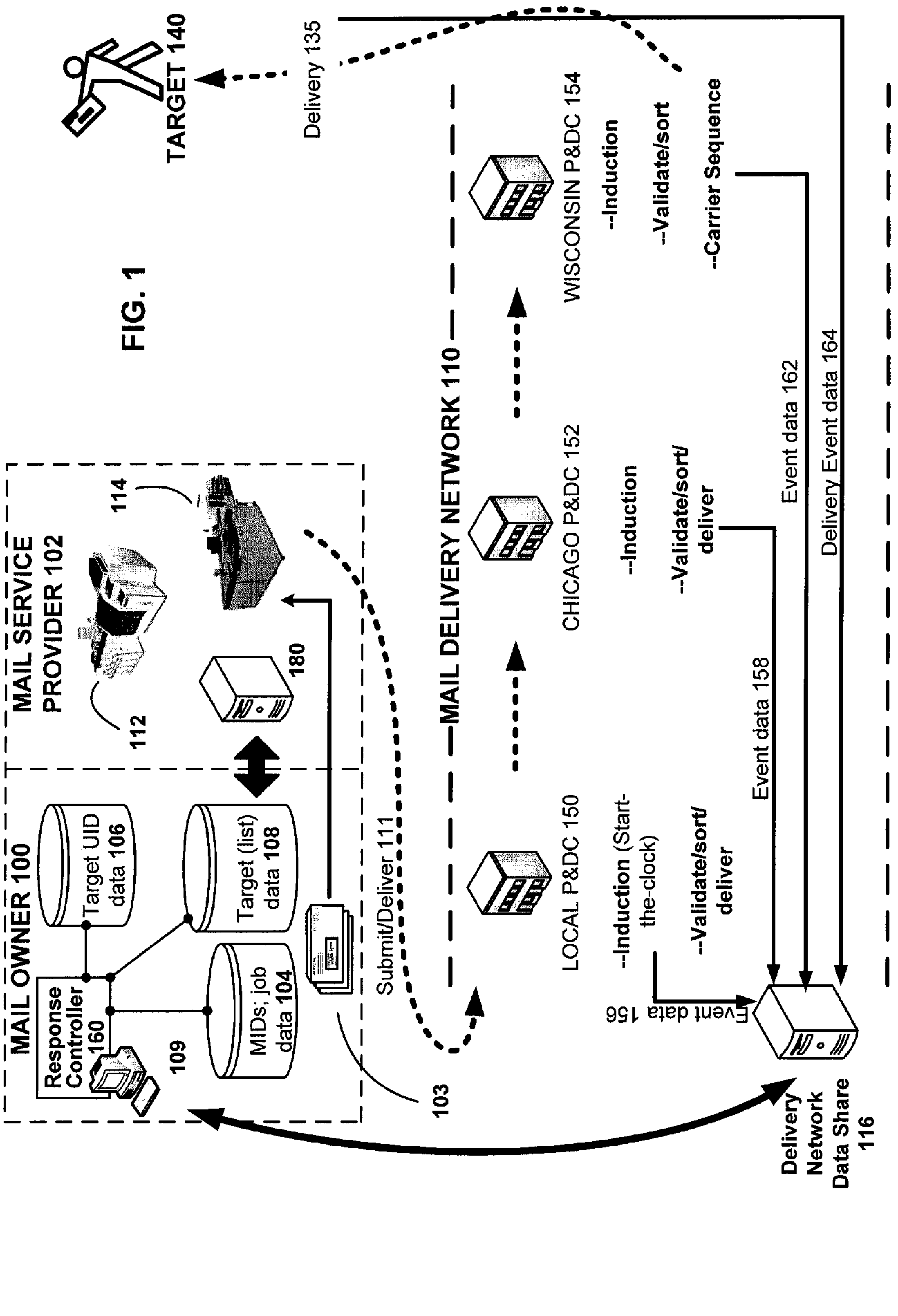
FIG. 1 depicts an exemplary high-level system for enabling tracking of event data by a mail owner of one or more mail items by mail target through a mail delivery network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In certain examples is desirable to provide a method for associating a customer reference identifier with a carrier approved barcode. A mail item is processed by a document processing device. A customer reference identifier as applied onto the mail item during processing by the document processing device is identified. A unique barcode is associated with the mail item during processing by the document processing device. The customer reference identifier and the unique barcode as associated are stored to a database. In certain examples, the identifying includes decoding a barcode containing the customer reference identifier. The customer reference identifier is applied directly and/or indirectly onto the mail item. The association includes printing the unique barcode onto the mail item, such as the clear zone. Also, a barcode identifier already present upon the mail item, such as in the address block, is scanned.

It is further desirable to acquire data pertaining to a mail item associated with a unique customer reference identifier. Data representative of at least a customer reference identifier and a unique barcode as applied to the mail item are stored to a database. The customer reference identifier is sufficient to associate the mail item with a plurality of related mail items. The mail item is submitted to a postal authority. Tracking data generated as a result of processing of the submitted mail item in association with the unique barcode is receiving from the postal authority. Based on reference to the unique barcode, the tracking data is referenced to the database in association with the customer reference identifier based on reference to the unique barcode. The tracking data in association with the customer reference identifier and the unique barcode is presented by way of generating a report or displaying it to a GUI. In certain examples, a unique customer reference identifier is assigned to a customer for use in relation to mail items to be processed by a sort processing service provider.

The teachings presented herein pertain to a system and method for enabling tracking of event data by a mail owner of one or more mail items specifically by mail target through a mail delivery network's mail stream. As used herein, a "mail stream" refers to the influx of items—physical and digital mail, documents and packages—across a mail delivery network to at least one intended mail recipient (mail target) to a registered delivery point. Various private and public mail delivery networks, such as the United States Postal Service (USPS) or Federal Express, may perform differing mail stream processing techniques and workflow procedures to meet delivery needs of their customers based on their respective processing capabilities, including but not limited to: physical delivery of mail items, induction of mail items to the mail stream, sorting of mail items by one or more mail processing machines, printing onto mail items by one or more printers, validation and/or correction of addresses as printed onto mail items via software and character recognition utilities, verification of mail item design requirements, scanning of mail items and other procedures.

Also, as used herein, the "mail delivery network" refers to any collection of coordinated resources in the form of nodes (e.g., independent processing facilities or sites), machines (sorters, inserters, software utilities, vehicles, computers, etc.), people and data for processing mail items and enabling their delivery to established destination points within the framework of the network. Typically, a mail delivery network comprising one or more of the above mentioned resources are distributed across a given geographic region—i.e., state, city, township, ZIP Code, such as to enable effective site-to-site processing of mail items starting from a point of origination to the desired destination point. Exemplary enterprises that operate a mail delivery network may include, but are not limited to a continental postal authority such as the United States Postal Service (USPS), a corporate carrier such as DHL or Federal Express, a private courier service or the like. With respect to the techniques presented herein, any mail item in process by a mail delivery network or an agent thereof is considered to have become a part of the mail stream of the mail delivery network.

Specifically, FIG. 1 depicts an exemplary high-level system for enabling tracking of event data by a mail owner 100 of one or more mail items 103 by a respective mail recipient or mail target 140 through a mail delivery network 110. In the FIG. 1, the mail owner 100 may act as the mail preparer, responsible for creation of the mail items to be directed to one or more targets 140. Alternatively, the mail owner 100 may outsource the mail item creation activity. In general, the mail owner 100 is responsible for identifying, gathering or coordinating the instructions and/or data pertaining to one or more targets 140 to which mail items 103 are to be directed via the mail delivery network 110. As such, the mail owner 100 possesses data regarding the one or more targets, including but not limited to: address and phone contact information, account status, detail and history detail, security data, transaction history, purchasing profiles, membership or enrollment details, etc. Of course, the type of information maintained will vary depending on the specific requirements or nature of the relationship between the target 140 and the mail owner 100. Those skilled in the art will recognize that various customer relationship management (CRM), contact management and other database driven tools are employed for maintaining data of this nature respective to one or more targets 140.

The mail owner 100 makes the original decision as to which targets their mail items are to ultimately be directed (e.g., the mailing list). In the case of a "captive mailer," the mail owner 100 actively generates their own mailing for distribution via the mail delivery network 110; oftentimes employing mail delivery network certified software tools and data to ensure proper usage and application of addresses, barcodes (e.g., PLANET, POSTNET, Intelligent Mail Barcode), etc. Alternatively, the mail owner 100 may outsource the mail generation and preparation tasks to a mail processing service provider 102 (e.g., letter shop or sort processing service provider) that employs various inserters 112, sorters 114 and/or other document processing equipment to generate and/or organize mail. In this case, the mail owner may transmit data 104 necessary to facilitate the outsourcing such as job requirements data, service agreement data, unique identifier data, print instructions, fold and insert requirements, sort instructions, mail induction and delivery requirements, pallet scheme data, etc.

Still further, in the case where mail is not prepared directly, the mail owner 100 may supply the necessary target data (list data) 108 suitable for enabling the processing and delivery of mail items. Data of this nature may include, but is not limited to, target name and/or alias data, address and ZIP Code data, suite and/or apartment information, etc. History data relevant to a target 140 may also be maintained within a database—i.e., managed via a CRM system—such as data indicative of the target's 140 past response patterns with respect to previous mail correspondence from the mail owner 100.

Whether captive or outsourced, the mail items are generally required to convey some form of unique identification approved by a postal authority or other mail delivery network 110 that links the mail owner 100 or agent thereof 102 to their mailing. This identification is assigned to the mail owner 100 or mail processing service provider 102 by a postal authority as a mailer identifier (MID). Resultantly, the mail items will bear one or more barcodes, address components and/or delivery point identifiers (e.g. ZIP Codes) corresponding to the delivery location of the target 140.

In association with the various databases maintained by the mail owner 100, or in some instances the mail processing service provider 102 on the owner's behalf is a response controller 160. The response controller 160 may be implemented as an executable module by way of software, hardware or a combination thereof operable via a computer 109 programmed to perform the following: assigning and maintaining unique identifiers relative to a particular mail target 140, executing instructions for accessing, retrieving or querying event based data regarding a mail item directed to a mail target 140 as provided by a delivery network data share 116 or other source of mail stream data, a local or remote graphical user interface accessible to the owner 100 for enabling execution of such features, etc. Artisans of ordinary skill will recognize that various means for implementing the response controller 160 may be performed and that the specific examples set forth herein are not meant to limit the scope of the present subject matter.

In particular, the response controller 160 enables the mail owner 100 to readily select and/or define the unique identifier expressly created for each mail target—i.e., encoded within a 2D barcode, then track the mail item's processing through the mail delivery network 110 on the basis of at least this unique identifier. Processing events that occur as the mail item moves through the delivery network mail stream 110 may include, but are not limited to, validating the mail item for compliance with postal authority design regulations, imaging the mail item to conduct delivery point verification, printing upon the mail item (e.g., address forwarding, sort instructions, mail status), scanning the mail item to record pertinent data that enables a general means of tracking by the mailer, sequencing it for final delivery, maintaining records of the aforementioned transactions by event code designation to a data share system 116, etc. Indeed, any event data that may be accumulated and conveyed to the mailer 100 or other interested party during processing of the postal authority approved code(s) as printed on the mail item; processed via one or more imaging, reading or other mail item identification detection devices, may trigger the conveyance of event data 156-162. Resultantly, the event data (i.e., formulated as metadata) conveyed to or retrieved by the response controller 160 in connection with processing of a postal authority approved code of a mail item is suitable for invoking the execution of a corresponding script. Generally speaking, metadata is data about data. As described herein, "metadata" may refer to any information that reveals the context and/or characteristics of other data (e.g., data structures, objects) how, when or by whom a particular set of data was collected, or how the data is formatted. This may include the compilation or encoding of information about data, such as a document, that aids in the discovery, assessment, history and management of the data. From a systems perspective, metadata compiled in association with system generated data is known for providing a means of recognizing and describing all aspects of the system: data, activities, people and organizations involved, locations of data and processes, access methods, limitations, timing and events, as well as intended utilization and rules with govern use of the metadata.

In particular, a graphical user interface (GUI), not shown, of the response controller 160 may feature various drop-down menus and/or check boxes for selecting pre-existing/known/typical mail processing events to track with respect to an assigned unique identifier of a mail target. Alternatively, the mail owner 100 may define a custom event type to be associated with a particular mail item associated with the mail target 140, an event code corresponding to that event type or other data which may be provided by the delivery network's data share 116. Of particular interest to the mail owner 100 may be any event data that indicates the point of induction of the mail item within the mail delivery network 110, the point of final arrangement of delivery of the mail item to the mail target 140 or that indicative of a particular machine type upon which the mail item is being processed. So, for example, a mail owner that is a credit card agency may alert an account manager to place a call to a mail target 140 in response to a start-the-clock event occurrence, such as to verbally communicate credit terms for that account in accordance with Unfair and Deceptive Acts or Practices (UDAP) rules. Of course, the extent to which the mail owner 100 may access information regarding a mail item in process through the mail stream is predicated upon the ability to trace the mail item to the target, even when the mail item is processed further by a mail processing service provider 102.

Once processed by the sort processing service provider 102 to completion, the mail items are delivered or submitted to the mail delivery network 111, wherein they eventually enter the mail delivery network 110 to be processed through the delivery network's mail stream. The mail item flows through the network 110 from one mail processing facility 150, 152 or 154 or stage to the next undergoing various types of processing one or more mail processing devices, each event or transactional occurrence 156, 158 or 162 undertaken being suitable for definition of an event based trigger. Events or transactions 156, 158 or 162 that may occur may include, but are not limited to: validating the transmitted mail item for compliance with postal authority design regulations and barcode quality requirements (e.g., USPS MERLIN™ compliance), orienting it for enabling postage reconciliation and verification, imaging it for performing address validation and delivery point verification (e.g., in accord with USPS CASS requirements), printing upon it by one or more printers, sequencing it for final delivery, scanning it to enable a general means of tracking by the mailer, etc. The aforementioned processing events may be performed by one or more automation devices operable within the mail delivery network, including but not limited to: Delivery Bar Code Sorters (DBCS), Carrier Sequence Bar Code Sorters (SCBCS), Mail Processing Bar Code Sorters, Multi-line Optical Character Readers, Advanced Facer Canceller System, printers, etc. As each mail item is processed in the above described ways respective to its printed barcode or other unique identification by the above described devices, event data 156 (e.g., induction, start-the-clock), 158 (e.g., interim processing events such as validation, tracking) or 162 (e.g., carrier route sequencing) pertaining to the barcode and hence mail item at that point in process may be conveyed to a data storage device (delivery network data share 116). Indeed, the event data 156, 158 or 162 conveyed as the mail item is transported from one mail processing stage, machine, facility 150-154, etc. to the next will feature varying condition codes, time tags and metadata, respectively. Metadata is data associated with the mail target that includes additional pertinent data about the target such as but not limited to delivery data, mail content, buying habits, personal data, demographics, promptness in bill payment, interests and hobbies.

Particularly with respect to the USPS, the event data pertaining to mail items in process may be captured and logged in near real-time so as to make the data available to the mail owner or another interested party. For example, in the case of the Intelligent Mail Barcode (IMB), event data indicating when and where a mail item is initially inducted into the mail delivery network 110 is provided as "start-the-clock" data. Still further, mail item data may be conveyed as one or more time tagged event codes indicative of the processing status of a mail item. Delivery event data 164 is collected at the time of delivery 135, such as the date and time the mail item was attempted for delivery, refused for delivery, returned to sender or forwarded. Delivery event data 164 may be limited to the date when the processed mail was provided to the mail carrier for delivery. Other event data such as the date, time, machine identification and location of carrier route sequencing of the mail item, date, time and location of subsequent destination entry induction of the mail item and other data pertaining to processing events collected prior to delivery may also be logged and conveyed with respect to the uniquely applied IMB or other identifier. In some cases, the event data collected to the data share 116 may be conveyed to the response controller 160 operating in connection with the mail owner 100 directly by the mail delivery network 110 (e.g., published to a secure web page or e-mailed). Alternatively, the event data 156-160 may be queried by the response controller 160 operating on behalf of the mail owner 100 via known data mining and extraction techniques. Event data 156-160 as described above may be gathered by way of various automation devices, imaging devices, scanning devices, verification systems and other data gathering, reading and interpretation means operable within the mail delivery network 110.

In regards to the teachings presented, a skilled artisan will recognize that the various actions described above with respect to the mail owner 100 may also be carried out by the mail service provider 102 on behalf of the owner 100. Hence, in the aforementioned paragraphs respective to FIG. 1, the actions and intentions of the mail owner 100 may be synonymous with that of the mail service provider 102. Indeed, the various databases 104-108 may be shared by the mail owner 100 and mail service provider 102 via a suitable shared database configuration and network communication means. Likewise, databases 104-108 may be implemented in a distributed fashion as opposed to a centralized manner respective to a single computing device 109 as depicted. Regardless of implementation, computing device 109 may have executable thereon or be in communication with, a response controller 160. As will be described further in FIGS. 2 and 3A-3C, the response controller 160 enables the queried event data to be matched to a specific mail target 140 in part on the basis of the mailpiece identifier 320 and a postal approved code 300 applied to the mail item in query.

Figures 3A, 3B, 3C:
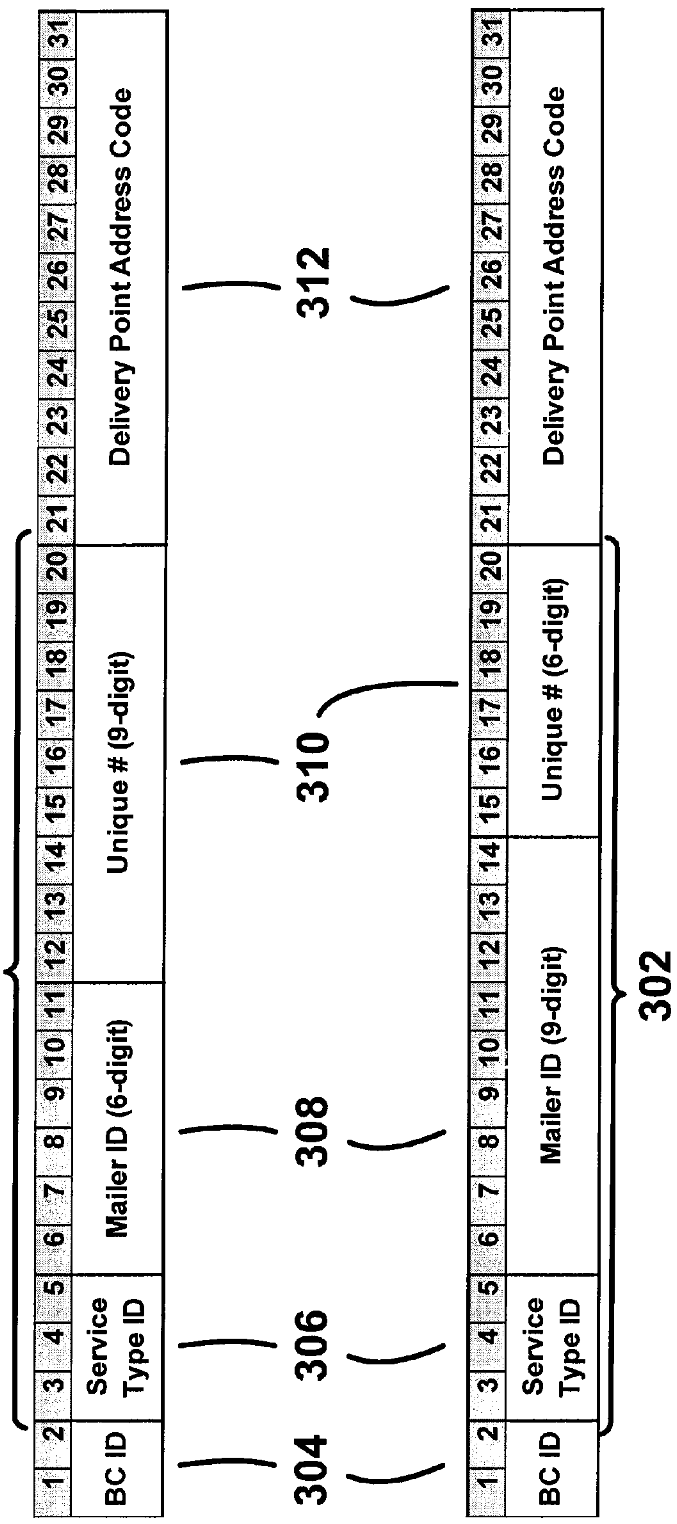
FIG. 3A depicts exemplary data, including that for a unique mail item identifier capable of being associated with a mail item destined for a postal sort group.
FIG. 3B depicts a barcode identifier based on the exemplary data containing the unique mail item identifier.
FIG. 3C depicts an exemplary 2D Data Matrix for storing a unique identification value expressly assigned to the mail target.

With respect to the examples presented herein, it is assumed the mail owner 100 submits its mail items 103 to a mail service provider 102 in the form of a sort processing facility that employs one or more sorters 114. To facilitate tracking with respect to a particular mail target 140, the mail owner 100 should print a unique identifier associated directly with the intended mail target 140 onto each respective mail item. An exemplary unique identifier for which to encode unique identification 106 assigned expressly in reference to the mail target 140 is the 2D data matrix 320, as shown in FIG. 3C. Known formally as the 2D barcode 320, this identifier in its various forms (square or rectangular) enables several bytes of data to be encoded (up to 2335 alphanumeric characters), including the unique identification value 106 of the mail target 140 and various of the other target data 108. The 2D data matrix barcode 320 may be printed directly onto the mail items 103 during mail preparation/creation, where it is visible from the address block window. Alternatively, other types of unique identifiers may be employed, included but not limited to, a unique serial number or alphanumeric value placed within the keyline, Aztec code, MaxiCode, radio frequency identifier tag and the like.

In addition to an identifier that uniquely references and is assigned to a respective mail target 140 (referred to herein as a unique mail target identifier), each mail item 103 must also display various delivery point identifiers as well as an approved tracking means for processing through the mail delivery network 110. More specifically, the tracking means should be unique and remain so for a given period of time as established by the postal authority regulations or mail delivery network 110.

FIGS. 3A-3B depict an exemplary postal authority approved code in the form of a barcode that allows for such tracking of mail items destined for placement within a particular postal authority or mail delivery network's mail stream. In particular, the exemplary barcode structure and type presented herein pertain to the Intelligent Mail Barcode (IMB) 300.

The IMB 300 is a height modulated barcode that uses varying vertical bar types to encode data as shown in FIG. 3A. When used to qualify for automation discounts, the IMB can be placed in the address block or in the barcode clear zone, generally found on the lower right corner of a mail item. The IMB 300 is a 31-digit postal authority code, with fields for encapsulating various data as shown in FIG. 3A. As recognized by those skilled in the art, various barcode generation software tools, fonts and/or encoders may be used to generate the IMB in accord with postal authority requirements. Data fields comprising the IMB 300 include, but are not necessarily limited to: a two-digit barcode identifier 304, a three-digit service type identifier 306, a six or nine-digit mailer identifier 308 (MID), a nine or six-digit unique number 310, and a delivery point address code 312 that can be zero, five, nine or eleven-digits. The MID 308 when taken in combination with the unique number 310 and service type identifier 306 comprise an 18-digit Unique Identifier 302.

The mailer ID (MID) 308 is generally defined and/or assigned by the postal authority based on the mailer's annual mail volume or other criteria. Generally, all 6-digit MIDs will begin with '0' through '8', while all 9-digit MIDs begin with '9'. The service type identifier 306 specifies a particular postal authority approved mail class and service(s) to be executed upon the mail item, such as First Class, Standard Mail, Periodicals, etc in the case of the USPS. The delivery point address code 312 contains ZIP Code data of varying ranges (e.g., 5-digit ZIP versus 11-digit ZIP). The unique number 310 may be assigned at the discretion of the mailer, which is typically the mail processing service provider 102, but must be certifiably unique for a period of time specified by the postal authority (e.g., 45 days for USPS). Various techniques for maintaining and determining uniqueness may be employed by the mailer for encoding as the unique number 310, including but not limited to: serializing the mail items, embedding Julian date parameters, embedding mailing event data, using mail target identifier data 106 or using database or mailing record ID. Those skilled in the art will recognize however that such 'static' encoding techniques are limited in their usefulness considering the dynamic nature of mail processing, particularly within a multiple document processing device environment; where a particular clients' mailing may be distributed across differing devices.

Those skilled in the art will recognize that the IMB is only one of several types of present day and future postal authority code implementations suited for the purpose of enabling unique mail item tracking within a mail delivery network 110. Though presented herein with respect to a postal authority (e.g., USPS), the exemplary techniques described may be applicable to any mail item delivery service or delivery network that may benefit from schemes to enable appropriate mail identification uniqueness. Indeed, any type of postal code, be it barcode based, alpha-numeric, graphical or other may be employed within the context of the examples herein.

Figure 2:
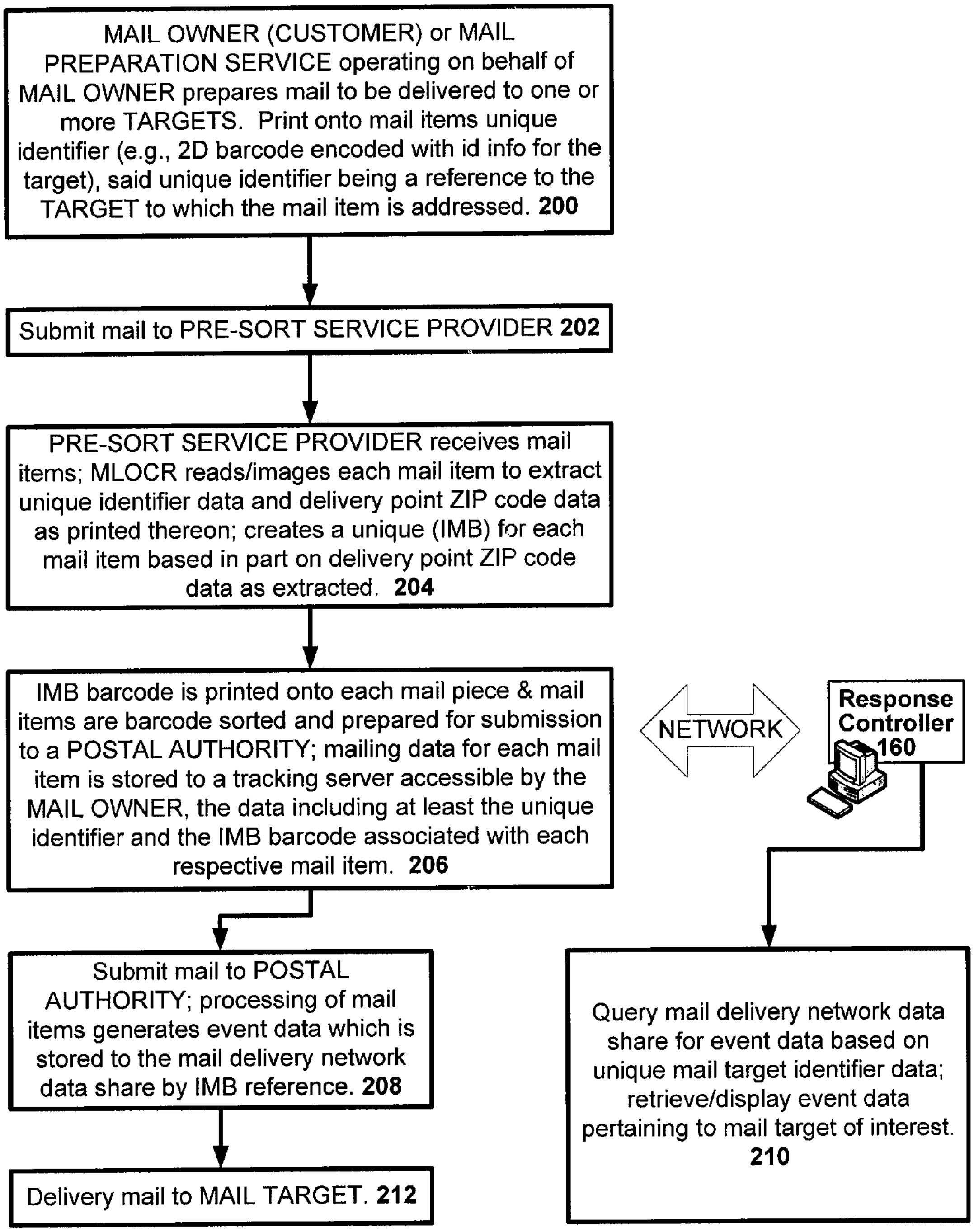
FIG. 2 is exemplary flowchart depicting the logical steps employed for enabling tracking of event data by a mail owner of one or more mail items by mail target through a mail delivery network.

While various other details regarding the IMB 300 may be emphasized, the discussion will proceed to FIG. 2, which presents an exemplary flowchart depicting the logical steps for enabling tracking of event data by a mail owner respective to a particular mail target 140. In particular, it will be seen that a means of advanced intelligence regarding the processing events of a specific mail item 103 for delivery 135 to a target 140 is achieved resultant to the combination of: (1) the unique identification means (e.g., 2D barcode) associated with and printed onto a respective mail item 103 and (2) the unique postal authority code (IMB) printed onto the respective mail item 103 for enabling postal authority processing and tracking through the mail delivery network 110. Image data stored and associated with the mail item further enhances the effectiveness and availability of a mail owner 100 to identify a specific mail item 103 pursuant to its various processing activities subsequent to handling by a mail service provider 102.

In FIG. 2, as a first event 200, the mail owner 100 (e.g., customer of the mail service provider 102) prepares a plurality of mail items 103 to be delivered to one or more mail targets 140. Those skilled in the art will recognize that a mail target 140 can be also referred to as a customer or intended mail recipient. This includes generation and production of the mail items as well as printing onto them an assigned unique identifier, the unique identifier being an express reference to the mail target 140 to which the mail item is addressed. As alluded to before, the unique identifier for reference to the mail target 140 may be encoded within a barcode, such as a 2D data matrix 320 which may be visible from the address block window. Hence, each mail item is associated with and printed therewith a unique identifier that is a direct reference to the mail target 140 in which the respective mail item 103 is intended. The relationship between each mail item and the specific target unique identifier may be maintained by the response controller 160 of the mail owner 100. Once produced, the mail items 103 may then be submitted to a mail service provider 102 for further processing (event 202).

Once the mail items 103 are received, the mail processing provider 102 processes them using an image ready sort processing device such as a multi-line optical line character reader (MLOCR) associated with an inserter 112 or sorter 114. The MLOCR reads/images each mail item to extract the unique identifier data as encoded within the 2D barcode or resident on the mail item directly. The MLOCR may be used to read the addressee and address associated with the mail target and associate it with the unique identifier. The MLOCR also extracts and interprets the delivery point ZIP Code data as printed on the mail item. Using this data, the MLOCR control computer then creates a unique (IMB) for each mail item based in part on delivery point ZIP Code data as extracted. It will be readily recognized that the IMB may be generated via known barcode creation and serial number management techniques. The ZIP Code data as extracted will be encoded within the IMB data structure as the delivery point address/routing code 312 of FIG. 3.

Having generated a unique IMB for each mail item and determined an associated unique mail target identifier, the generated IMB barcode is printed onto each mail item accordingly. This prepares the mail items for barcode based sorting, by one or more sort processing devices 114, so that they are sufficient to submit to the Postal Authority or other mail delivery network 110. During sort processing, the mail items may again be imaged by an imaging device, wherein specific data of interest may be captured and eventually extracted from the image for subsequent retrieval by the response controller 160 of the mail owner 100. In addition to storing an image of the face of each mail item, the response controller 160 may also receive and/or store data pertaining to: the unique mail target identifier; and the postal authority barcode as printed thereon (e.g., located in the clear zone region of the mail item).

Hence, such data for each mail item is stored to a tracking server maintained by the mail service provider 102, the tracking server being further accessible by the response controller 160. Alternatively, the above described data may be stored direct to the response controller 160 when captured via a network communication link (labeled NETWORK) between the mail service provider 102 and the mail owner 100. In other instances, the above described data is transferred to the tracking server and by the response controller 160 in the form of Host Address List (HAL) files (e.g., when mail items were submitted to the mail processing service provider by the mail owner already in presort order). All of the aforementioned steps correspond to event 206.

With respect now to event 208, having prepared the mail items sufficiently, the mail items 103 are submitted to a postal authority within mail delivery network 110 for delivery 135 to the mail target 140. Processing of each mail item generates event data, which is stored to the mail delivery network data share 116 by reference to the IMB as detected/imaged/scanned on the mail item. As such, this event data is made available to the mailer, typically the mail processing service provider 102, so as to enable them to track the progress of the mail items submitted on behalf of one or more mail owners. The event data is then matched with/compared against the postal authority barcode and unique mail target identifier data generated as a result of MLOCR processing or from the HAL files, to update the delivery status of every mail piece.

In event 210, where mail owner 100 wants to gain event data/status pertaining to a specific mail target 140, the response controller 160 queries the tracking server 180 maintained by the mail processing service provider (or the data share 116 directly) for event data related to the mail items submitted to the mail delivery network.

The mail owner 100 can access the tracking server through an internet or intranet web-based interface of the response controller 160. As such, the mail owner 100 would begin the query by indicating the particular mail target of interest, as referenced by the unique mail target identifier of that mail target, the mail target name, address, etc. Via the response controller interface, the mail owner 100 could search for and view the delivery 135 status of individual mail items related to the specific mail target 140, as well as an entire mailing or group of mailings associated therewith. As such, the mail owner may readily locate correspondence to its customer by direct reference, effectively enabling a means of tracking or mail items by the mail owner 100 without the use of non-postal barcodes. The above described steps correspond to event 210, which may occur concurrent or subsequent to actual physical delivery 135 of the mail item to the mail target (event 212).

As shown by the above discussion, functions relating pertain to the tracking of mail items through a postal authority network with reference to a specific mail target may be implemented on one or more computers operating as the control processor 160 connected for data communication with the processing resources as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the control processor 160 and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for tracking of mail items through a postal authority network with reference to a specific mail target, in essentially the manner performed in the implementations discussed and illustrated herein.

Figure 4:
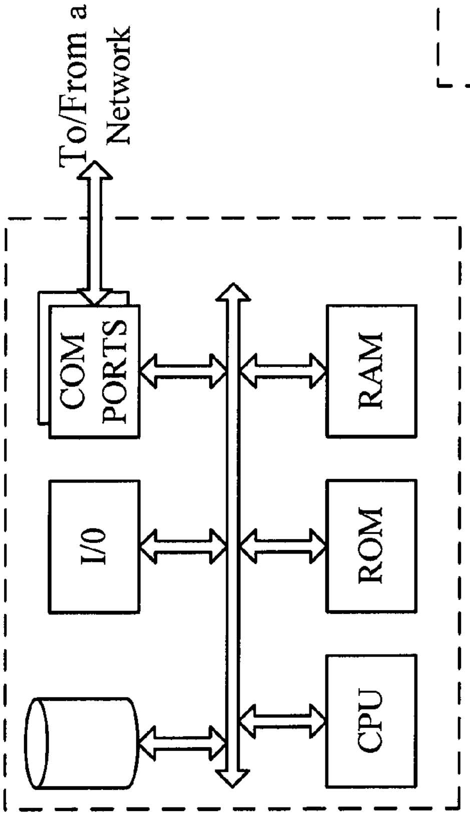
FIG. 4 illustrates a network or host computer platform, as may typically be used to implement a server.
Figure 5:
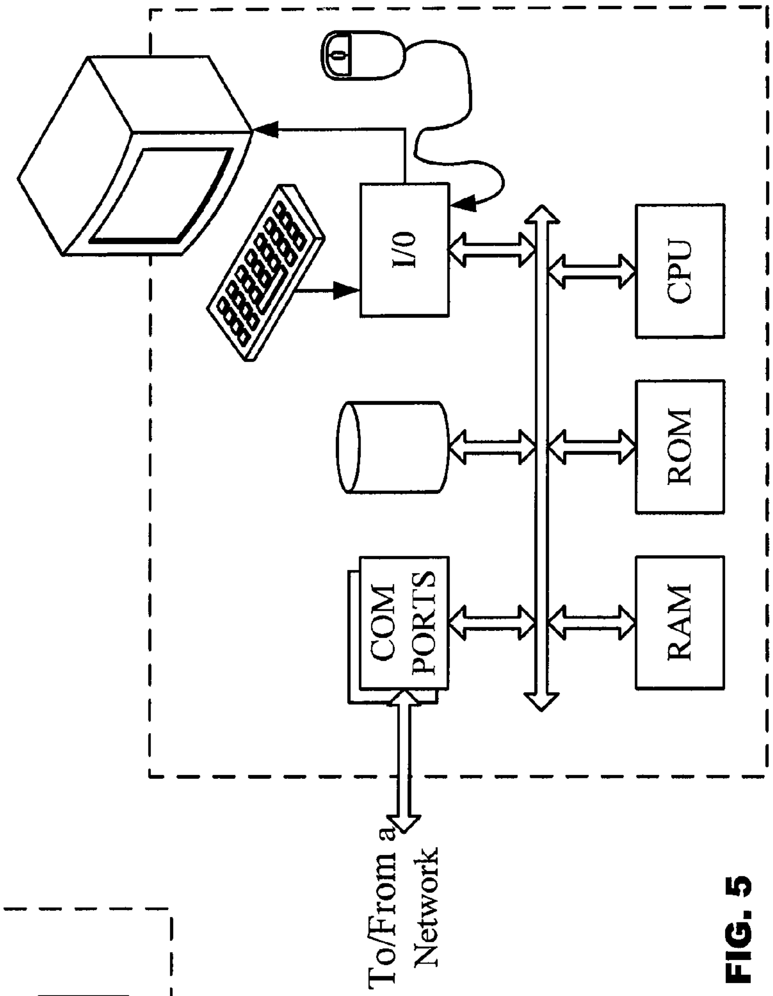
FIG. 5 depicts a computer with user interface elements.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and, as a result, the drawings should be self-explanatory.

For example, control processor 160 may be a PC based implementation of a central control processing system like that of FIG. 5, or may be implemented on a platform configured as a central or host computer or server like that of FIG. 4. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of mail items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of associating data of a mail item with an intended mail target to which the mail item is addressed in an address block, during processing of the mail item through a mail production environment and a mail delivery network, the method comprising steps of:

on a mail sorting device in the mail production environment, reading a mail item identifier from an address block on the mail item;

associating the mail item identifier with:

the mail target to which the mail item is addressed in the address block of the mail item, and metadata associated with the mail target, the metadata is data associated with the mail target selected from one or more of: mail content, buying habits, personal data, demographics, promptness in bill payment, interests or hobbies;

generating a postal authority delivery point barcode containing a unique mail item identifier;

associating the mail item identifier from the address block on the mail item with the unique mail item identifier;

printing the postal authority delivery point barcode on the mail item;

transferring of mail item to the mail delivery network;

storing event data from processing of the mail item in the mail delivery network; and generating a report containing information obtained during the processing of the mail item through the mail production environment and the mail delivery network.

2. The method according to claim 1, wherein the reading step includes:

reading the mail item identifier through an address block window of the mail item.

3. The method according to claim 1, wherein the intended mail target is selected from a mail customer or intended mail recipient.

4. The method according to claim 1, wherein the transferring step includes:

transferring the mail item to one or more postal authority processing facilities, corporate mail carriers, or private couriers.

5. The method according to claim 4, further comprising the step of:

delivering the mail item to the mail target.

6. The method according to claim 1, further comprising the step of:

extracting the mail item identifier and delivery point data from the mail item for generation of the unique mail item identifier of the postal authority delivery point barcode.

7. The method according to claim 1, further comprising the step of:

storing the mail item identifier and postal authority delivery point barcode together with the data and metadata.

8. The method according to claim 7, further comprising the step of accessing of the stored event data and metadata, mail item identifier and postal authority delivery point barcode by a mail owner.

9. The method according to claim 1, wherein the report generating step includes:

printing of the report or displaying it on a graphical user interface (GUI).

10. The method according to claim 1, wherein the reading step includes:

reading the mail item identifier from a 2D Data matrix, a unique serial number, or alphanumeric value placed within a keyline, Aztec code, MaxiCode or a radio frequency identifier tag.

* * * * *